(12) United States Patent
Murakami et al.

(10) Patent No.: US 10,518,350 B2
(45) Date of Patent: Dec. 31, 2019

(54) ARC WELDING APPARATUS, ARC WELDING SYSTEM, AND ARC WELDING METHOD

(71) Applicant: KABUSHIKI KAISHA YASKAWA DENKI, Kitakyushu-shi (JP)

(72) Inventors: Masafumi Murakami, Kitakyushu (JP); Taichi Sakamoto, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 947 days.

(21) Appl. No.: 14/296,391

(22) Filed: Jun. 4, 2014

(65) Prior Publication Data

US 2014/0360996 A1 Dec. 11, 2014

(30) Foreign Application Priority Data

Jun. 7, 2013 (JP) ................................ 2013-120735

(51) Int. Cl.
*B23K 9/09* (2006.01)
*B23K 9/095* (2006.01)
(Continued)

(52) U.S. Cl.
CPC ............ *B23K 9/0953* (2013.01); *B23K 9/093* (2013.01); *B23K 9/0956* (2013.01); *B23K 9/1062* (2013.01); *B23K 9/125* (2013.01)

(58) Field of Classification Search
CPC .... B23K 9/093; B23K 9/0953; B23K 9/0956; B23K 9/1062; B23K 9/125
See application file for complete search history.

(56) References Cited

U.S. PATENT DOCUMENTS

| 4,724,302 A | * | 2/1988 | Penney | B23K 9/0956 |
| | | | | 156/350 |
| 4,920,249 A | * | 4/1990 | McLaughlin | B23K 9/0956 |
| | | | | 219/124.34 |

(Continued)

FOREIGN PATENT DOCUMENTS

| CN | 102361722 | 2/2012 |
| JP | 57-081961 | 5/1982 |

(Continued)

OTHER PUBLICATIONS

Korean Office Action for corresponding KR Application No. 10-2014-0067357, dated Feb. 22, 2016.

(Continued)

*Primary Examiner* — Ibrahime A Abraham
*Assistant Examiner* — Frederick F Calvetti
(74) *Attorney, Agent, or Firm* — Mori & Ward, LLP

(57) ABSTRACT

An arc welding apparatus includes: a welding-condition acquirer configured to acquire a welding condition; a heat-input calculator configured to calculate a required heat input corresponding to the welding condition; a frequency setter configured to set a smaller frequency for a short circuit condition and an arc condition corresponding to an increase in the required heat input; and a driver configured to repeatedly perform a process at the frequency, the process including advancing and retreating a welding consumable with respect to a workpiece to generate the short circuit condition and the arc condition.

10 Claims, 6 Drawing Sheets

(51) Int. Cl.
*B23K 9/10* (2006.01)
*B23K 9/12* (2006.01)

(56) References Cited

U.S. PATENT DOCUMENTS

| | | | | |
|---|---|---|---|---|
| 5,061,841 | A * | 10/1991 | Richardson | B23K 9/0956 |
| | | | | 219/130.01 |
| 6,969,823 | B2 * | 11/2005 | Huismann | B23K 9/091 |
| | | | | 219/130.5 |
| 6,992,264 | B2 * | 1/2006 | Morimoto | B23K 9/073 |
| | | | | 219/130.51 |
| 7,220,941 | B2 * | 5/2007 | Niedereder | B23K 9/0953 |
| | | | | 219/130.5 |
| 2004/0040945 | A1 * | 3/2004 | Morimoto | B23K 9/073 |
| | | | | 219/130.51 |
| 2005/0103768 | A1 * | 5/2005 | Ward | B23K 9/10 |
| | | | | 219/132 |
| 2006/0196862 | A1 * | 9/2006 | Sickels | B23K 9/12 |
| | | | | 219/130.5 |
| 2008/0156781 | A1 * | 7/2008 | Artelsmair | B23K 9/091 |
| | | | | 219/130.5 |
| 2009/0026188 | A1 * | 1/2009 | Schorghuber | B23K 9/124 |
| | | | | 219/137 PS |
| 2010/0126976 | A1 * | 5/2010 | Kawamoto | B23K 9/0953 |
| | | | | 219/125.1 |
| 2011/0174784 | A1 | 7/2011 | Kamei | |
| 2012/0074115 | A1 * | 3/2012 | Kazmaier | B23K 9/09 |
| | | | | 219/130.51 |
| 2012/0111842 | A1 * | 5/2012 | Fujiwara | B23K 9/09 |
| | | | | 219/130.33 |
| 2013/0180971 | A1 * | 7/2013 | Peters | B65H 51/10 |
| | | | | 219/137.7 |
| 2013/0299476 | A1 | 11/2013 | Fujiwara et al. | |
| 2014/0203003 | A1 * | 7/2014 | Fujiwara | B23K 9/09 |
| | | | | 219/125.1 |
| 2014/0251971 | A1 * | 9/2014 | Hearn | B23K 9/092 |
| | | | | 219/130.51 |
| 2017/0036288 | A1 * | 2/2017 | Albrecht | B23K 9/0953 |

FOREIGN PATENT DOCUMENTS

| | | |
|---|---|---|
| JP | 3802642 B2 | 9/1998 |
| JP | 2002-178147 | 6/2002 |
| JP | 2004298924 | * 10/2004 |
| JP | 2006-346694 | 12/2006 |
| JP | 2010-099711 | 5/2010 |
| JP | 2010-221226 | 10/2010 |
| JP | 2012-081501 | 4/2012 |
| JP | 5201266 B2 | 6/2013 |
| WO | WO 2011/013321 | 2/2011 |
| WO | WO 2013/008394 | 1/2013 |

OTHER PUBLICATIONS

Korean Office Action for corresponding KR Application No. 10-2014-0067357, dated Aug. 6, 2015.
Chinese Office Action for corresponding CN Application No. 201410184139.6, dated Sep. 29, 2015.
Japanese Office Action for corresponding JP Application No. 2013-120735, dated May 19, 2015.
Extended European Search Report for corresponding EP Application No. 14169602.1-1702, dated Jul. 9, 2015.
European Office Action for corresponding EP Application No. 14 169 602.1-1702, dated Jan. 25, 2017.

* cited by examiner

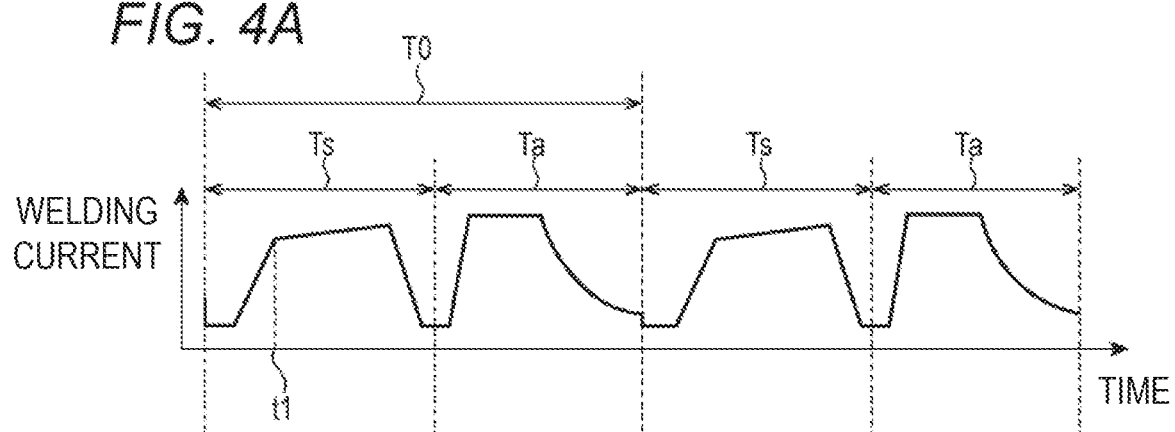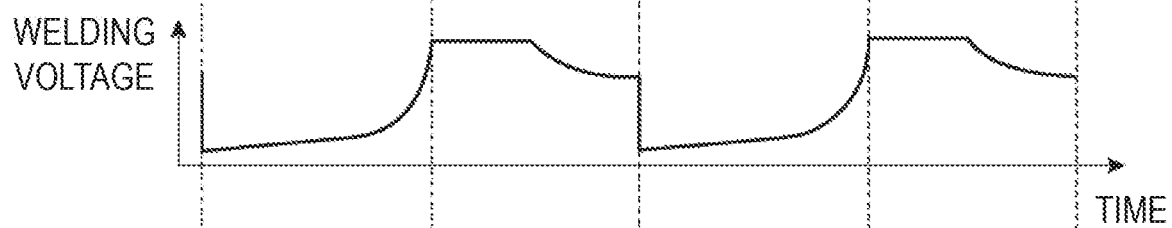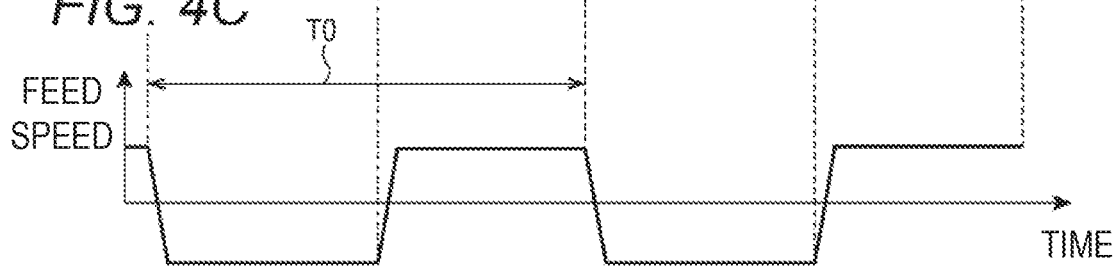

ARC WELDING APPARATUS, ARC WELDING SYSTEM, AND ARC WELDING METHOD

CROSS-REFERENCE TO RELATED APPLICATION

This application claims priority from Japanese Patent Application No. 2013-120735 filed with the Japan Patent Office on Jun. 7, 2013, the entire content of which is hereby incorporated by reference.

BACKGROUND

1. Technical Field

This disclosure relates to an arc welding apparatus, an arc welding system, and an arc welding method.

2. Related Art

For example, an arc welding apparatus in practical use repeatedly advances and retreats a welding consumable with respect to a workpiece so as to perform welding while periodically generating a short circuit condition and an arc condition. In this arc welding apparatus, it is required to ensure penetration depth so as to ensure strength in a welded portion. To increase the penetration depth, it is possible to increase the electric current between the workpiece and the welding consumable so as to increase heat input. On the other hand, the amount of the electric current and the consumption amount of the welding consumable tend to be proportional to each other. That is, the consumption of the welding consumable increases with increase in electric current. Here, an arc welding apparatus disclosed in JP-A-2012-81501 advances a welding consumable to generate a short circuit condition and then further advances the welding consumable until a predetermined time passes. This apparatus allows pushing a fusion portion by the welding consumable instead of increasing the electric current. Accordingly, it is expected to increase the penetration depth while suppressing the consumption of the welding consumable.

SUMMARY

An arc welding apparatus includes: a welding-condition acquirer configured to acquire a welding condition; a heat-input calculator configured to calculate a required heat input corresponding to the welding condition; a frequency setter configured to set a smaller frequency for a short circuit condition and an arc condition corresponding to an increase in the required heat input; and a driver configured to repeatedly perform a process at the frequency, the process including advancing and retreating a welding consumable with respect to a workpiece to generate the short circuit condition and the arc condition.

BRIEF DESCRIPTION OF DRAWINGS

FIGS. 4A to 4C are graphs illustrating an electric current, a voltage, and a wire feeding speed during welding;

DETAILED DESCRIPTION

Figure 1:
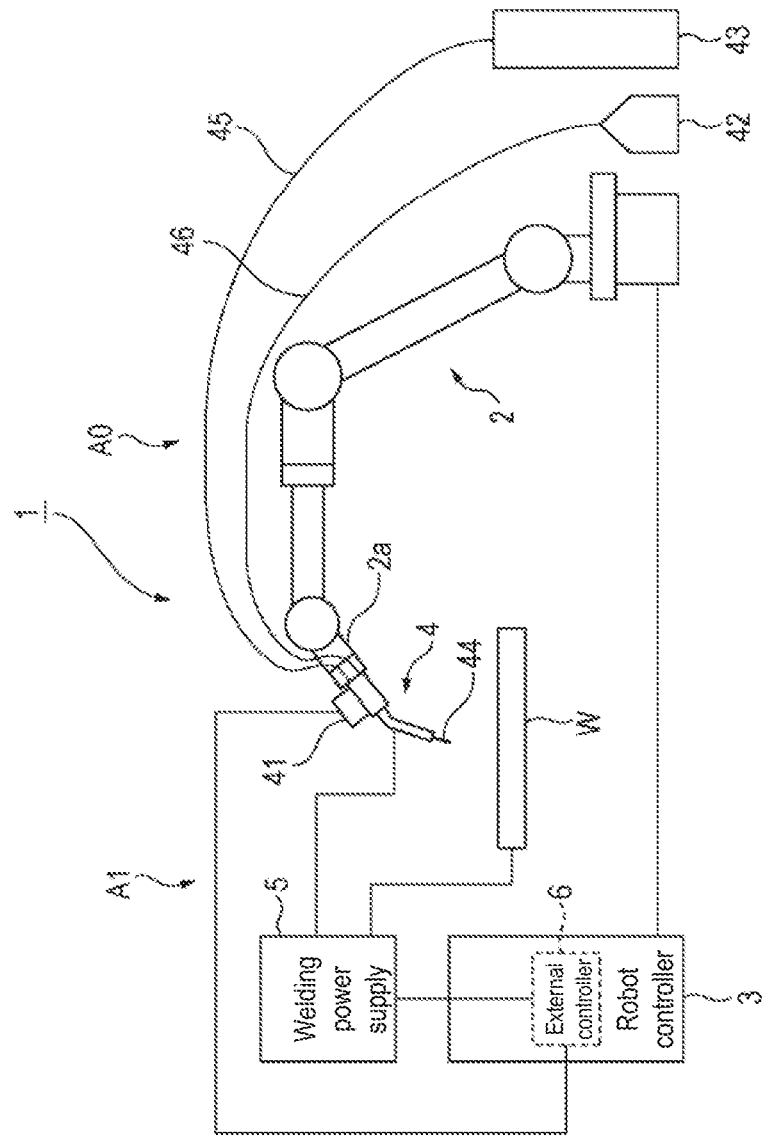
FIG. 1 is a schematic diagram of an arc welding system that includes an arc welding apparatus according to a first embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The arc welding apparatus according to one embodiment of this disclosure includes: a welding-condition acquirer configured to acquire a welding condition; a heat-input calculator configured to calculate a required heat input corresponding to the welding condition; a frequency setter configured to set a smaller frequency for a short circuit condition and an arc condition corresponding to an increase in the required heat input; and a driver configured to repeatedly perform a process at the frequency, the process including advancing and retreating a welding consumable with respect to a workpiece to generate the short circuit condition and the arc condition.

The arc welding apparatus according to one embodiment of this disclosure may be, for example, an apparatus for performing welding while repeatedly generating a short circuit condition and an arc condition.

An arc welding system according to one embodiment of this disclosure includes above-described arc welding apparatus and a welding robot configured to hold and move the driver.

An arc welding method performed by an arc welding apparatus according to one embodiment of this disclosure includes: acquiring a welding condition; calculating a required heat input corresponding to the welding condition; setting a smaller frequency for a short circuit condition and an arc condition corresponding to an increase in the required heat input; and repeatedly performing a process at the frequency, the process including advancing and retreating a welding consumable with respect to a workpiece to generate the short circuit condition and the arc condition.

One embodiment of this disclosure allows controlling the heat input while suppressing the consumption of the welding consumable.

The following describes preferred embodiments of this disclosure in detail with reference to the accompanying drawings. In the following description, like reference numerals designate corresponding or identical elements or elements with corresponding or identical functions, and therefore such elements will not be further elaborated here.

<First Embodiment>

As illustrated in FIG. 1, an arc welding system 1 includes a robot apparatus A0 and an arc welding apparatus A1. The robot apparatus A0 includes a robot 2 and a robot controller 3. The robot 2 is, for example, a serial-link robot arm. The robot 2 includes a tip portion with a tool mounter 2a. On the tool mounter 2a of the robot 2, a welding torch 4 described later is mounted. The robot controller 3 controls actuators of the robot 2 such that the welding torch 4 moves along a welding target portion.

While repeatedly advancing and retreating a welding wire (welding consumable) 44 with respect to a workpiece W, the arc welding apparatus A1 supplies electric power between the welding wire 44 and the workpiece W so as to repeatedly generate a short circuit condition and an arc condition. The arc welding apparatus A1 includes the welding torch 4, an external controller 6, and a welding power supply 5.

The welding torch 4 is mounted on the tool mounter 2a of the robot 2 as described above. To the welding torch 4, a pail pack 42 is coupled via a conduit cable 46. Further, to the welding torch 4, a gas cylinder 43 is coupled via a gas hose 45. The pail pack 42 houses the welding wire 44 wound in a coil shape. The pail pack 42 supplies the welding wire 44 to the welding torch 4 through the conduit cable 46. The welding wire 44 is fed from the tip of the welding torch 4. The gas cylinder 43 contains shielding gas. The gas cylinder 43 supplies the shielding gas to the welding torch 4 through the gas hose 45. The shielding gas can employ, for example, carbon dioxide, argon, or the mixed gas of these.

The welding torch 4 includes a feeding mechanism 41. The feeding mechanism 41 performs, for example, forward feed and reverse feed of the welding wire 44 using an actuator such as a servo motor as a power source. The forward feed means that the welding wire 44 is advanced such that the tip of the welding wire 44 approaches the workpiece W. The reverse feed means that the welding wire 44 is retreated such that the tip of the welding wire 44 moves away from the workpiece W. That is, the feeding mechanism 41 corresponds to a driver that advances and retreats the welding wire 44 with respect to the workpiece W. The robot 2 on which the welding torch 4 is mounted corresponds to a welding robot that holds and moves the driver. Hereinafter, the feed speed during the forward feed of the welding wire 44 is referred to as "advancing speed." Additionally, the feed speed during the reverse feed of the welding wire 44 is referred to as "retreating speed."

Figure 2:
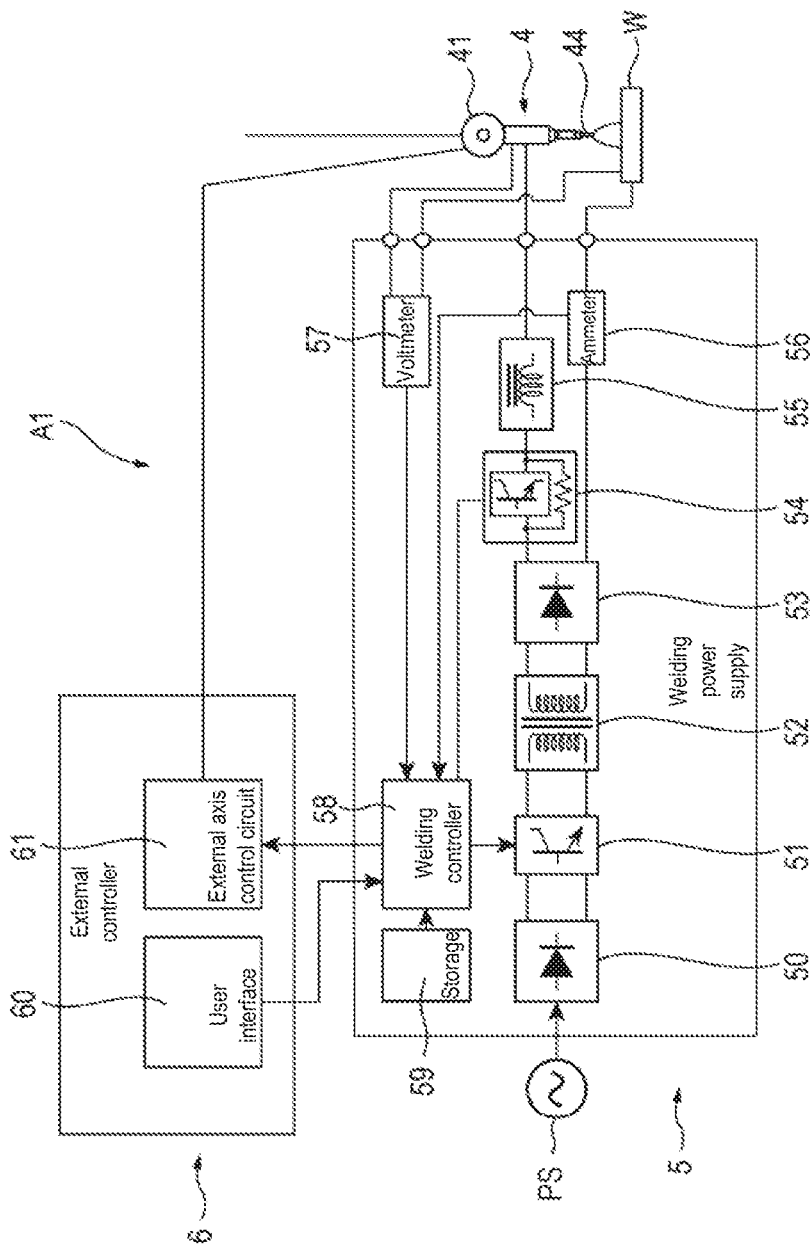
FIG. 2 is a pattern diagram illustrating the configuration of the arc welding apparatus.

The external controller 6 is incorporated in the robot controller 3. As illustrated in FIG. 2, the external controller 6 includes a user interface 60 and an external axis control circuit 61. The user interface 60 accepts, for example, an input of welding conditions from outside (for example, a user) through a keyboard, a touchscreen, or similar interface. The welding conditions include at least one of, for example, a bead width, a penetration depth, a thickness of workpiece, a welding electric current value, a welding voltage value, and a feed speed of the welding wire 44. The welding electric current is an electric current between the welding torch 4 and the workpiece W. The welding voltage is a voltage between the welding torch 4 and the workpiece W. The external axis control circuit 61 is disposed in the robot controller 3 to control, for example, an actuator such as an actuator of a tool to be mounted on the tool mounter 2a other than the actuators of the robot 2. The external axis control circuit 61 controls the actuator of the feeding mechanism 41 in this embodiment.

The welding power supply 5 includes a primary rectifier circuit 50, a switching circuit 51, a transformer 52, a secondary rectifier circuit 53, a cut-off circuit 54, a reactor 55, an ammeter 56, a voltmeter 57, a welding controller 58, and a storage 59. The welding power supply 5 supplies the electric power for welding to the welding torch 4 and the workpiece W.

The primary rectifier circuit 50 is coupled to a commercial AC power supply PS and rectifies alternating current. The switching circuit 51 adjusts the supply power to the welding torch 4 by PWM. The transformer 52 transforms the output from the switching circuit 51, and insulates the input side and output side from each other. The secondary rectifier circuit 53 further rectifies the output from the transformer 52. The cut-off circuit 54 is constituted of, for example, a semiconductor. The cut-off circuit 54 cuts off the supply power to the welding torch 4 in response to a cut-off command. The reactor 55 smooths the supply power to the welding torch 4. The ammeter 56 measures the electric current (hereinafter referred to as "welding electric current") between the welding torch 4 and the workpiece W. The voltmeter 57 measures the voltage (hereinafter referred to as "welding voltage") between the welding torch 4 and the workpiece W.

The welding controller 58 is a computer that controls the feeding mechanism 41 and the switching circuit 51 so as to perform an arc welding method according to this embodiment. The storage 59 is, for example, a non-volatile memory. The storage 59 stores, for example, the control patterns of feeding of the welding wire 44, the welding electric current, and the welding voltage, and/or various values described later.

Figure 3:
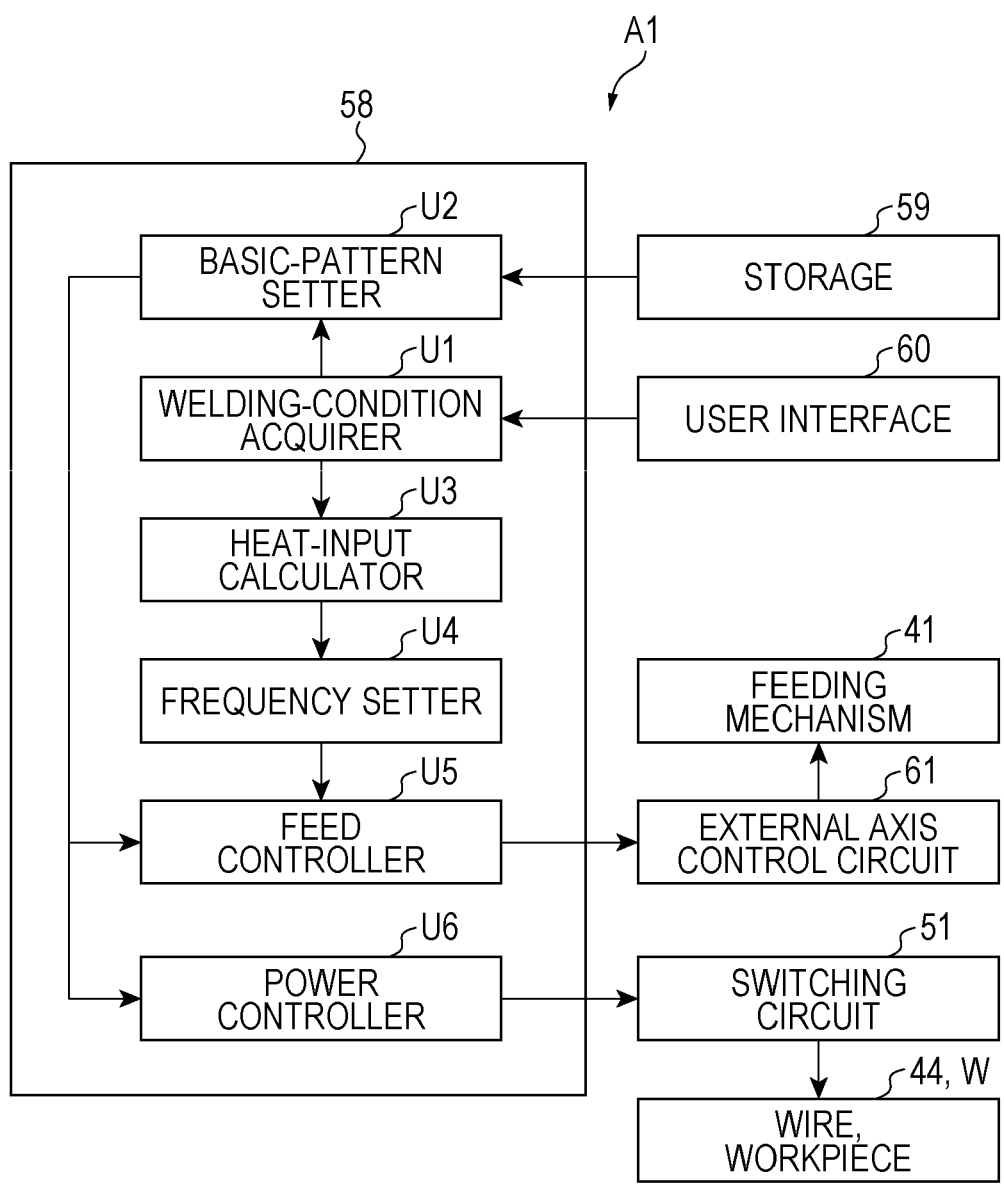
FIG. 3 is a block diagram illustrating the functional configuration of the arc welding apparatus.

As illustrated in FIG. 3, the welding controller 58 includes a welding-condition acquirer U1, a basic-pattern setter U2, a heat-input calculator U3, a frequency setter U4, a feed controller U5, and a power controller U6. While illustration is omitted, respective members of the welding controller 58 are configured to refer to the various values and similar data stored in the storage 59. The welding-condition acquirer U1 acquires the welding conditions from the user interface 60.

The basic-pattern setter U2 determines the respective target values of the welding electric current value and the welding voltage value based on the welding conditions acquired by the welding-condition acquirer U1. Then, the basic-pattern setter U2 sets a control pattern (hereinafter, this control pattern is referred to as "basic pattern") appropriate for these target values. Specifically, the basic-pattern setter U2 selects a control pattern appropriate for the above-described target values as the basic pattern from the control patterns stored in the storage 59. This basic pattern corresponds to a power basic pattern. The basic-pattern setter U2 also can set the basic pattern of the feed speed.

The heat-input calculator U3 acquires at least one of the bead widths, the penetration depth, the thickness of workpiece, the welding electric current value, the welding voltage value, and the feed speed of the welding wire 44 from the welding-condition acquirer U1 as a calculation condition. Then, the heat-input calculator U3 calculates the required heat input corresponding to this calculation condition. The heat input is a heat amount given to the welded portion in one cycle including the short circuit condition and the arc condition. For example, the heat-input calculator U3 sets a larger required heat input corresponding to an increase in bead width, penetration depth, or thickness of workpiece.

The frequency setter U4 acquires the required heat input from the heat-input calculator U3 to set the frequency for the short circuit condition and the arc condition corresponding to this required heat input. Specifically, the frequency setter U4 sets a smaller frequency for the short circuit condition and the arc condition corresponding to an increase in required heat input. For example, the frequency setter U4 uses a function prepared in advance to have a smaller frequency corresponding to an increase in required heat input so as to calculate the frequency corresponding to the required heat input. Alternatively, the frequency setter U4 refers to a table prepared in advance to have a smaller frequency corresponding to an increase in required heat input so as to select the frequency corresponding to the required heat input. Hereinafter, the frequency set by the frequency setter U4 is referred to as "the set frequency."

The feed controller U5 outputs the target values for the feed speed to the external axis control circuit 61 so as to control the feeding mechanism 41. The power controller U6 controls the welding electric current and the welding voltage. That is, the power controller U6 drives the switching circuit 51 such that the welding electric current and the welding voltage approach the target values. With reference to FIGS. 4A to 4C, a description will be given of a concrete example of controls performed by the feed controller U5 and the power controller U6.

FIG. 4A is a graph illustrating a waveform of the welding electric current. In FIG. 4A, the horizontal axis denotes the time while the vertical axis denotes the welding electric current value. FIG. 4B is a graph illustrating a waveform of the welding voltage. In FIG. 4B, the horizontal axis denotes the time while the vertical axis denotes the welding voltage value. FIG. 4C is a graph illustrating a waveform of the feed speed. The horizontal axis in FIG. 4C denotes the time. The vertical axis in FIG. 4C denotes the feed speed assuming that the forward feed side is the positive side while the reverse feed side is the negative side. Here, FIG. 4C illustrates the feed speed with the trapezoidal waveform. This, however, should not be construed in a limiting sense. The feed speed may have a sine wave shape, a rectangular wave shape, or a triangular wave shape. The same applies to FIG. 6C described later.

The feed controller U5 acquires the basic pattern of the feed speed from the basic-pattern setter U2 and acquires the set frequency from the frequency setter U4. Then, the feed controller U5 controls the feeding mechanism 41 to repeat the forward feed and the reverse feed at the set frequency in accordance with the basic pattern (see FIG. 4C). Accordingly, the feeding mechanism 41 repeatedly advances and retreats the welding wire 44 with respect to the workpiece W at the set frequency. Here, in this embodiment, the forward feed and the reverse feed of the welding wire 44 by the feeding mechanism 41 are performed concurrently with movement of the welding torch 4 by the robot 2.

When the forward feed of the welding wire 44 is performed, the fusion portion of the welding wire 44 and the workpiece W are brought into contact with each other in the course of the forward feed. Accordingly, the short circuit condition is started. When the reverse feed of the welding wire 44 is performed, the welding wire 44 and the workpiece W are separated from each other in the course of the reverse feed. Accordingly, the arc condition is started. Thus, the short circuit condition and the arc condition are repeated corresponding to the forward feed and the reverse feed of the welding wire 44. Accordingly, when a cycle T0 for the forward feed and the reverse feed of the welding wire 44 expands and contracts, a continuation time (hereinafter referred to as "short circuit period") Ts of the short circuit condition and a continuation time (hereinafter referred to as "arc period") Ta of the arc condition expand and contract correspondingly.

As described above, the short circuit condition and the arc condition are generated by repeating the forward feed and the reverse feed of the welding wire 44 at the set frequency by the feeding mechanism 41. Therefore, the feeding mechanism 41 corresponds to a driver that advances and retreats the welding wire 44 with respect to the workpiece W to generate the short circuit condition and the arc condition repeatedly at the set frequency.

The power controller U6 acquires the basic patterns of the welding electric current and the welding voltage from the basic-pattern setter U2. Additionally, the power controller U6 acquires respective welding electric current value and welding voltage value from the ammeter 56 and the voltmeter 57. The power controller U6 drives the switching circuit 51 such that the welding electric current and the welding voltage transition in accordance with the basic pattern. The basic patterns of the welding electric current and the welding voltage are set to repeat the same waveforms every short circuit period Ts and arc period Ta.

During the transition from the short circuit condition to the arc condition, the welding voltage sharply rises (see FIG. 4B). Based on this sharp rise, the start of the arc condition is detected. The welding voltage sharply drops during the transition from the arc condition to the short circuit condition. Based on this sharp drop, the start of the short circuit condition is detected.

The waveform of the welding electric current in the short circuit period Ts is set to keep a state at low electric current and then gradually increase corresponding to the elapsed time (see FIG. 4A). The raising rate of the welding electric current with respect to the elapsed time can be changed at a time t1. The raising rate of the welding electric current after the time t1 is slower than the raising rate of the welding electric current before the time t1. The basic pattern of the welding electric current in the arc period Ta is set to keep approximately a constant value and then gradually decrease corresponding to the elapsed time.

As described above, the power controller U6 controls the welding electric current and the welding voltage in accordance with the basic pattern. Additionally, the power controller U6 performs a control that reduces the welding electric current during the transition from the short circuit condition to the arc condition. This reduces spatter. For details, the power controller U6 drives the switching circuit 51 to reduce the welding electric current before the transition from the short circuit condition to the arc condition. Additionally, the power controller U6 drives the switching circuit 51 to raise the welding electric current after the start of the arc condition. The power controller U6 can detect the timing for reducing the welding electric current based on, for example, the elapsed time from the start of the short circuit condition. Alternatively the power controller U6 may detect the above-described timing based on the welding electric current value or the welding voltage value. Additionally, instead of reducing the electric current by the switching circuit 51, the power controller U6 may cause the cut-off circuit 54 to cut off the electric current. Further, instead of raising the electric current by the switching circuit 51, the power controller U6 may deactivate the cut-off state by the cut-off circuit 54.

Thus, the control that repeats the short circuit condition and the arc condition at the set frequency is executed. As described above, the set frequency is reduced corresponding to an increase in required heat input. Reduction in set frequency causes a longer cycle T0. Consequently, the arc period Ta in each cycle becomes longer. This allows increasing the heat input corresponding to an increase in required heat input. That is, adjusting the set frequency allows controlling the heat input. On the other hand, a change in set frequency does not have much influence on the welding electric current, thus not having much influence on the consumption amount of the welding wire 44. Accordingly, this allows controlling the heat input while suppressing the consumption of the welding consumable.

<Second Embodiment>

Figure 5:
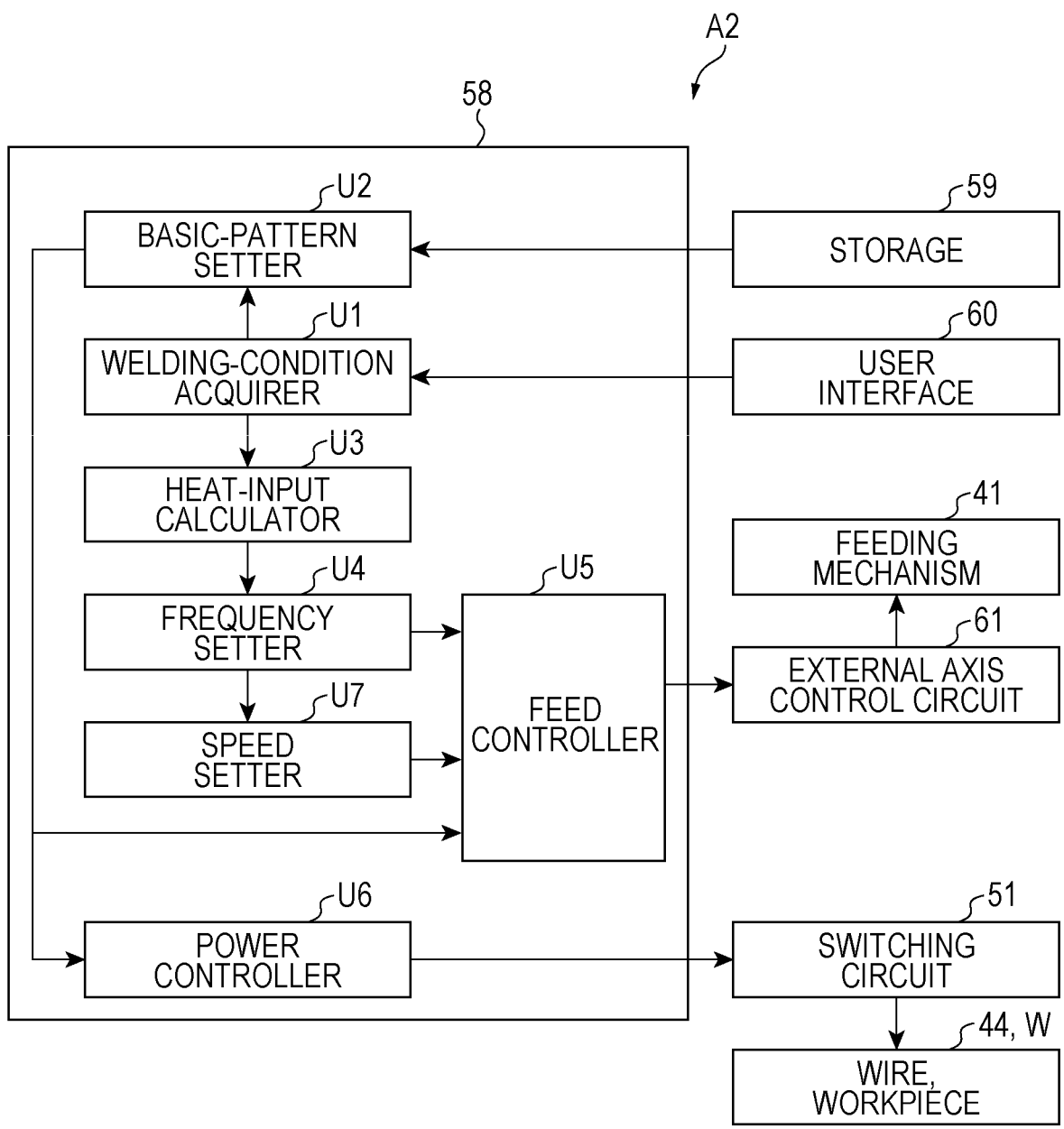
FIG. 5 is a block diagram illustrating the functional configuration of an arc welding apparatus according to a second embodiment.

An arc welding apparatus A2 according to a second embodiment differs from the arc welding apparatus A1 in the functional configuration of the welding controller 58. As illustrated in FIG. 5, the welding controller 58 of the arc welding apparatus A2 further includes a speed setter U7 in addition to the welding-condition acquirer U1, the basic-pattern setter U2, the heat-input calculator U3, the frequency setter U4, the feed controller U5, and the power controller U6.

The speed setter U7 sets the advancing speed and the retreating speed of the welding wire 44 corresponding to the set frequency by the frequency setter U4. Specifically, the speed setter U7 sets the advancing speed and the retreating speed to increase the ratio of the magnitude of the retreating speed to the magnitude of the advancing speed corresponding to a decrease in set frequency. The speed setter U7 may increase the magnitude of the retreating speed without changing the advancing speed. Additionally, the speed setter U7 may decrease the magnitude of the advancing speed without changing the retreating speed. Further, the speed setter U7 may decrease the magnitude of the advancing speed and increase the magnitude of the retreating speed at the same time.

For example, the speed setter U7 uses a function prepared in advance to increase the ratio of the magnitude of the retreating speed to the magnitude of the advancing speed corresponding to a decrease in set frequency, so as to calculate the advancing speed and the retreating speed corresponding to the set frequency. Alternatively, the speed setter U7 refers to a table prepared in advance to increase the ratio of the magnitude of the retreating speed to the magnitude of the advancing speed corresponding to a decrease in set frequency, so as to select the advancing speed and the retreating speed corresponding to the set frequency. Hereinafter, the advancing speed and the retreating speed that are set by the speed setter U7 are respectively referred to as "set advancing speed" and "set retreating speed."

The feed controller U5 in the arc welding apparatus A2 acquires the basic pattern of the feed speed from the basic-pattern setter U2 and acquires the set frequency from the frequency setter U4. Further, the feed controller U5 acquires the set advancing speed and the set retreating speed from the speed setter U7. Then, the feed controller U5 uses the set advancing speed as the feed speed during the forward feed and the set retreating speed as the feed speed during the reverse feed. The feed controller U5 controls the feeding mechanism 41 to repeat the forward feed and the reverse feed in accordance with the basic pattern at the set frequency. Accordingly, the feeding mechanism 41 advances the welding wire 44 with respect to the workpiece W at the set advancing speed and retreats the welding wire 44 with respect to the workpiece W at the set retreating speed. Thus, the feeding mechanism 41 advances and retreats the welding wire 44 repeatedly at the set frequency.

Figure 6A:
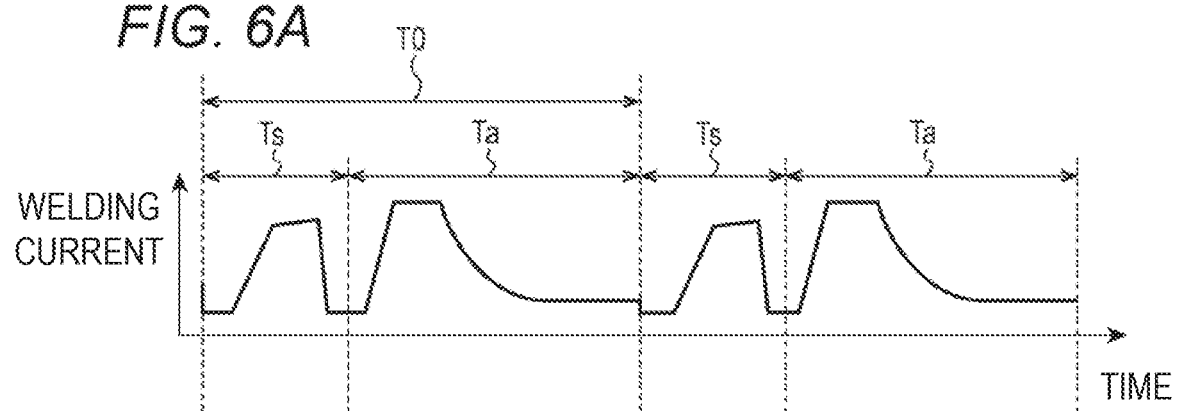
FIGS. 6A to 6C are graphs illustrating an electric current, a voltage, and a wire feeding speed during welding.
Figure 6B:
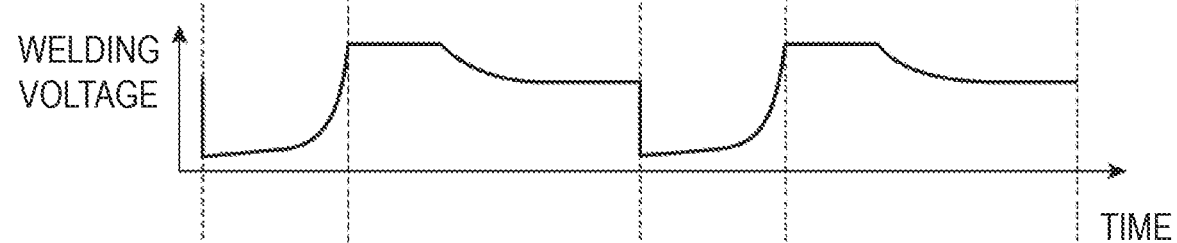
Figure 6C:
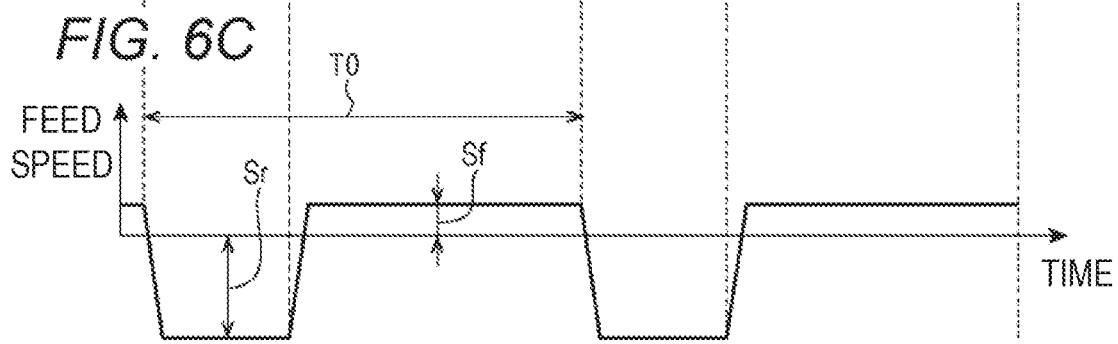

As described above, the speed setter U7 increases the ratio of the magnitude of the set retreating speed to the magnitude of the set advancing speed corresponding to a decrease in set frequency. FIGS. 6A to 6C are graphs illustrating the respective electric current, voltage, and wire feeding speed during welding in the case where the ratio of the magnitude of a retreating speed Sr to the magnitude of an advancing speed Sf is increased compared with the first embodiment in FIGS. 4A to 4C. The illustrations in respective graphs of FIG. 6A, FIG. 6B, and FIG. 6C are similar to those in FIG. 4A, FIG. 4B, and FIG. 4C. When the ratio of the magnitude of the retreating speed Sr to the magnitude of the advancing speed Sf is increased, the transition from the short circuit condition to the arc condition becomes earlier. Thus, as illustrated in FIGS. 6A to 6C, the ratio of the arc period Ta to the short circuit period Ts increases. This ensures a longer arc period Ta in each cycle, thus ensuring a larger heat input. That is, adjusting the set frequency and adjusting the ratio of the magnitude of the retreating speed to the magnitude of the advancing speed allows more widely controlling the heat input. On the other hand, a change in ratio of the magnitude of the retreating speed to the magnitude of the advancing speed does not have much influence on the welding electric current, thus not having much influence on the consumption amount of the welding wire 44. Accordingly, this allows more widely controlling the heat input while suppressing the consumption of the welding consumable.

The preferred embodiments of this disclosure have been described above. This disclosure is not limited to the above-described embodiments. Various changes of this disclosure may be made without departing from the spirit and scope of this disclosure. For example, the external controller 6 need not be incorporated in the robot controller 3. The external controller 6 may be one independent unit or may be integrated with the welding power supply 5.

In this embodiment, welding-condition acquiring means corresponds to the welding-condition acquirer U1 and heat-input calculating means corresponds to the heat-input calculator U3. Additionally, frequency setting means corresponds to the frequency setter U4 and driving means corresponds to the feeding mechanism 41.

An arc welding apparatus, an arc welding system, and an arc welding method according to this disclosure may be first to third arc welding apparatuses, a first arc welding system, and a first arc welding method as follows.

The first arc welding apparatus is an apparatus for performing welding while repeatedly generating a short circuit condition and an arc condition. The apparatus includes a condition acquirer, a heat-input calculator, a frequency setter, and a driver. The condition acquirer is configured to acquire a welding condition. The heat-input calculator is configured to calculate a required heat input corresponding to the welding condition. The frequency setter is configured to set a smaller frequency for the short circuit condition and the arc condition corresponding to an increase in the required heat input. The driver is configured to repeatedly advance and retreat a welding consumable with respect to a workpiece at the frequency.

According to the second arc welding apparatus, in the first arc welding apparatus, the welding condition includes at least one of a bead width, a penetration depth, a thickness of the workpiece, a welding electric current value, a welding voltage value, and a feed speed of the welding consumable.

According to the third arc welding apparatus, in the first or second arc welding apparatus, a speed setter is further provided. The speed setter is configured to set an advancing speed and a retreating speed of the welding consumable such that a ratio of a magnitude of the retreating speed to a magnitude of the advancing speed increases as the frequency decreases. The driver is configured to advance the welding consumable with respect to the workpiece at the advancing speed and retreat the welding consumable with respect to the workpiece at the retreating speed.

The first arc welding system includes any one of the first to third arc welding apparatuses and a welding robot configured to hold and move the driver.

The first arc welding method is a method performed by an arc welding apparatus for performing welding while repeatedly generating a short circuit condition and an arc condition. The method includes acquiring a welding condition; calculating a required heat input corresponding to the welding condition; setting a smaller frequency for the short circuit condition and the arc condition corresponding to an increase in the required heat input; and repeatedly advancing and retreating a welding consumable with respect to a workpiece at the frequency.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An arc welding apparatus comprising:
   a feeding mechanism configured to forward feed and reverse feed a welding consumable with respect to a workpiece;
   a user interface configured to accept an input of a welding condition including at least one of a desired bead width or a desired penetration depth;
   a welding computer configured to:
      acquire the welding condition from the user interface; and
      control the feeding mechanism to repeatedly advance and retreat the welding consumable with respect to the workpiece to generate a short circuit condition and an arc condition, each advance and retreat of the welding consumable forming a cycle, wherein
   the welding computer is configured to increase a duration of the cycle based on an increase in the desired bead width and/or the desired penetration depth.

2. The arc welding apparatus according to claim 1, wherein
   the welding condition further includes a thickness of the workpiece, a welding electric current value, a welding voltage value, and a feed speed of the welding consumable.

3. An arc welding apparatus comprising:
   a feeding mechanism configured to forward feed and reverse feed a welding consumable with respect to a workpiece;
   a user interface configured to accept an input of a welding condition including at least one of a desired bead width or a desired penetration depth;
   a welding computer configured to:
      acquire the welding condition from the user interface; and
      control the feeding mechanism to repeatedly advance and retreat the welding consumable with respect to the workpiece to generate a short circuit condition and an arc condition, each advance and retreat of the welding consumable forming a cycle, wherein
   the welding computer is configured to set an advancing speed and a retreating speed of the welding consumable such that a ratio of a magnitude of the retreating speed to a magnitude of the advancing speed increases as a duration of the cycle increases,
   the welding computer is configured to control the driver to advance the welding consumable with respect to the workpiece at the advancing speed and retreat the welding consumable with respect to the workpiece at the retreating speed, and
   the welding computer is configured to increase the duration of the cycle based on an increase in the desired bead width and/or the desired penetration depth thereby increasing the magnitude of the retreating speed relative to the magnitude of the advancing speed.

4. The arc welding apparatus according to claim 1, wherein the welding computer is configured to:
   set a basic pattern of a feed speed;
   control the driver to repeat forward feed and reverse feed in accordance with the basic pattern.

5. The arc welding apparatus according to claim 4, wherein the welding computer is configured to:
   control a welding electric current and a welding voltage,
   determine respective target values of a welding electric current value and a welding voltage value based on the welding condition so as to set a power basic pattern that is a control pattern appropriate for these target values, and
   control a welding electric current and a welding voltage in accordance with the power basic pattern.

6. The arc welding apparatus according to claim 5, wherein
   the welding computer is configured to reduce the welding electric current during transition from the short circuit condition to the arc condition.

7. An arc welding system, comprising
   the arc welding apparatus according to claim 1; and
   a welding robot configured to hold and move the driver.

8. An arc welding method performed by an arc welding apparatus, comprising:
   acquiring a welding condition via a user interface configured to accept an input of the welding condition including at least one of a desired bead width or a desired penetration depth;
   setting a duration of a cycle formed by a short circuit condition and an arc condition;
   increasing the duration of the cycle based on an increase in the desired bead width and/or the desired penetration depth; and
   repeatedly advancing and retreating a welding consumable with respect to a workpiece to generate the short circuit condition and the arc condition at the set duration of the cycle.

9. The arc welding method according to claim 8, wherein the welding condition further includes a thickness of the workpiece, and a feed speed of the welding consumable.

10. The arc welding apparatus according to claim 1, wherein the duration of the cycle is increased based on a function stored in a memory the computer or a table stored in the memory of the computer.

* * * * *